(12) United States Patent
Barnes et al.

(10) Patent No.: US 12,061,713 B2
(45) Date of Patent: Aug. 13, 2024

(54) DATABASE MANAGEMENT TOOL

(71) Applicant: T-Mobile Innovations LLC, Overland Park, KS (US)

(72) Inventors: William Luke Barnes, Seattle, WA (US); Wade Nolan Murri, Bellevue, WA (US); Scott Tuan Quach, Lynnwood, WA (US); Siddharth Razdan, Woodinville, WA (US); Ricardo De Roullett Thompson, Auburn, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 321 days.

(21) Appl. No.: 17/555,319

(22) Filed: Dec. 17, 2021

(65) Prior Publication Data

US 2023/0195924 A1    Jun. 22, 2023

(51) Int. Cl.
  *G06F 21/62*  (2013.01)
  *G06F 16/28*  (2019.01)

(52) U.S. Cl.
  CPC ........ *G06F 21/6227* (2013.01); *G06F 16/282* (2019.01); *G06F 2221/2113* (2013.01); *G06F 2221/2141* (2013.01)

(58) Field of Classification Search
  CPC ........ G06F 16/10; G06F 16/17; G06F 16/172; G06F 16/176; G06F 16/1767; G06F 16/178; G06F 16/20; G06F 16/22; G06F 16/221; G06F 16/23; G06F 16/2308; G06F 16/2315; G06F 16/2329; G06F 16/24; G06F 16/245; G06F 21/60; G06F 21/62; G06F 21/6227; G06F 21/6218; G06F 2221/2113; G06F 2221/2141
  See application file for complete search history.

(56) References Cited

U.S. PATENT DOCUMENTS

| | | | |
|---|---|---|---|
| 11,538,113 B1 * | 12/2022 | Kessel | G16H 15/00 |
| 2011/0113058 A1 * | 5/2011 | Lee | G06Q 50/01 |
| | | | 707/769 |
| 2016/0179841 A1 * | 6/2016 | Ford | G06F 16/29 |
| | | | 701/532 |
| 2023/0195924 A1 * | 6/2023 | Barnes | G06F 16/24552 |
| | | | 726/26 |

* cited by examiner

*Primary Examiner* — Boris D Grijalva Lobos

(57) ABSTRACT

A method of managing data using a three-tier database to support fast searching and cell-wise access policy management. The method comprises determining access permissions to a three-tier database associated with a user interface by a client application executing on a computer system, wherein the access permissions are applied on a per data cell basis and on a per record basis; presenting records of a selected table of the three-tier database in accordance with the access permissions associated with the user interface by the client application to the user application; receiving an edit by the client application from the user interface; writing the edit to the three-tier database by the client application in accordance with the access permissions; and propagating by the client application change notifications indicating the edit to a plurality of client instances associated with different user interfaces.

20 Claims, 10 Drawing Sheets

DATABASE MANAGEMENT TOOL

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern enterprises rely upon vast volumes of data to manage and to execute their businesses. Failure to apply controls on this data to keep the data confidential and to keep the data free from corruption can cause many difficulties. At the same time, the data desirably is stored in such a way to promote using the data, updating the data, and interpreting the data conveniently and quickly. Data is stored in mass storage devices. Access to the data is mediated by computers and data management applications executing on the computers.

SUMMARY

In an embodiment, a management tool for managing a three-tier database to support fast searching and cell-wise access policy management is disclosed. The management tool comprises a first-tier database comprising a plurality of tables, wherein each record of the plurality of tables of the first-tier database comprises a single data cell, a cell identity, a key, and a time and date; a second-tier database comprising a same number of tables as the first-tier database, wherein each record of the plurality of tables of the second-tier database comprises a single data cell, a cell identity, and a key, wherein the data cell of each record of the second database stores the value of the data cell of the most current record having the same key and cell identity in the first database; and a third-tier database comprising the same number of tables as the first-tier database, wherein each record of the plurality of tables of the third-tier database comprises a complete record comprising a key and a plurality of data cells, wherein each data cell stores the value of the data cell of a corresponding column in the second database. The management tool also comprises a cache that is implemented as a flat text file, wherein the cache is rebuilt occasionally based on a current state of the third-tier database and the cache stores the data values stored in the data cells of the third database at the time it is rebuilt; a processor; a non-transitory memory; and a client application stored in the non-transitory memory. When executed by the processor, the client application launches a client instance associated with a user, reads a copy of one of the tables out of the cache, and determines an access policy associated with the user associated with the client instance, where the access policy defines records and cells that the user is permitted to access and other records and other cells that the user is not permitted to access. The client application also, in accordance with the access policy associated with the user, presents at least some of the records and at least some of the cells to the user, in accordance with the access policy associated with the user, receives an edit of at least one record and at least one cell from the user, propagates the edit to a table of the first-tier database that corresponds to the table copied out of the cache, propagates the edit to a table of the second-tier database that corresponds to the table copied out of the cache, and propagates the edit to a table of the third-tier database that corresponds to the table copied out of the cache.

In another embodiment, a method of managing data using a three-tier database to support fast searching and cell-wise access policy management is disclosed. The method comprises determining access permissions associated with a user interface by a client application executing on a computer system, wherein the access permissions are applied on a per cell basis and on a per record basis and receiving an edit of the three-tier database by the client application from the user interface. The method also comprises writing the edit to the three-tier database by the client application in accordance with the access permissions, wherein the three-tier database comprises a first-tier database comprising a plurality of tables, wherein each record of the plurality of tables in the first-tier database comprises a single data cell, a cell identity, a key, and a time and date, a second-tier database comprising a same number of tables as the first-tier database, wherein each record of the plurality of tables of the second-tier database comprises a single data cell, a cell identity, and a key, wherein the data cell of each record of the second database stores the value of the data cell of the most current record having the same key and cell identity in the first-tier database, and a third-tier database, comprising the same number of tables as the first-tier database, wherein each record of the plurality of tables of the third-tier database comprises a key and a plurality of data cells, wherein each data cell stores the value of the data cell of a corresponding column in the second-tier database. The method also comprises receiving a first search request by the client application from the user interface, wherein the first search request stipulates a historical type of search; in response to the first search request, initiating by the client application a first search in the first-tier database; and returning results of the first search by the client application to the user interface; The method also comprises receiving a second search request by the client application from the user interface, wherein the second search request does not stipulate a historical type of search; in response to the second search request, initiating by the client application a second search in the second-tier database; and returning results of the second search by the client application to the user interface.

In yet another embodiment, a method of managing data using a three-tier database to support fast searching and cell-wise access policy management. The method comprises launching a user interface by a client application executing on a computer system; presenting a list of a plurality of tables stored in the three-tier database by the client application to the user interface; and receiving a selection of one of the plurality of tables by the client application from the user interface. The method also comprises looking up records of the selected table by the client application in a flat text file stored in a cache; determining access permissions associated with the user interface by the client application, wherein the access permissions are applied on a per data cell basis and on a per record basis; and presenting the records of the selected table in accordance with the access permissions associated with the user interface by the client application to the user application. The method also comprises receiving an edit by the client application from the user interface; writing the edit to the three-tier database by the client application in accordance with the access permissions; propagating by the client application change notifications indicating the edit to a plurality of client instances associated with different user interfaces; determining that changes to the three-tier database have accumulated to above a predefined threshold; and, in response to the changes to the three-tier database exceeding the predefined threshold, updating the cache by the client application based on the changes.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
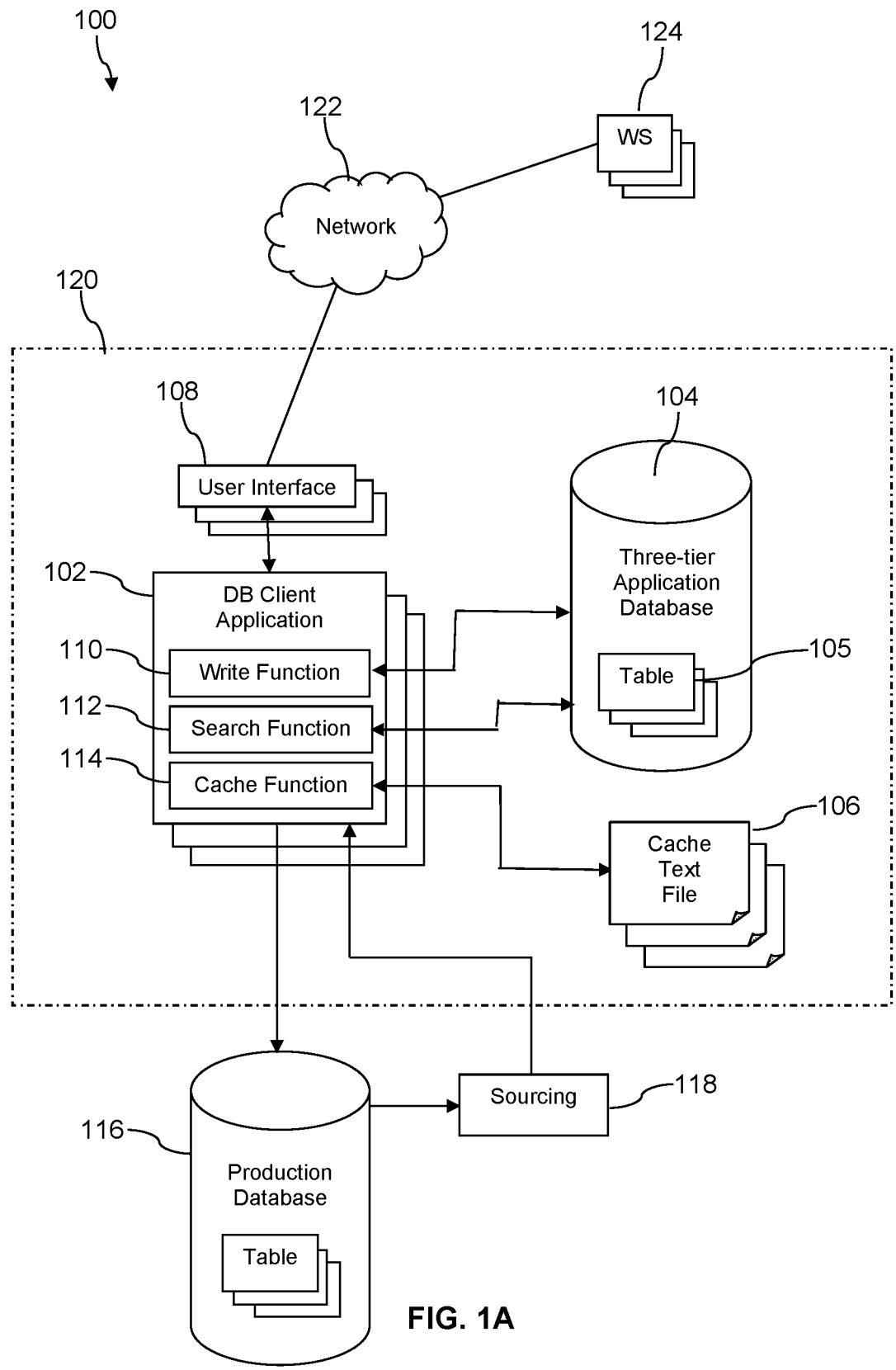
FIG. 1A is a block diagram of a computer system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a complex database management tool that builds and interacts with a three-tier application database and a production database. A user inputs data to the tool, the tool writes the new data into the three-tier application database and likewise writes the new data into the production database. The three-tier application database comprises a first-tier application database, a second-tier application database, and a third-tier application database. Each of these application database tiers stores substantially the same end-use data ('end-use data' is the data of interest to users or to the business versus data related to the end-use data, such as when a record in the database was created or modified, who created or modified the record, etc.) but stores the end-use data in a different representational form. The tables that are stored in the three-tier application database are also stored in the production database, but the production database may store additional tables that are not stored in the three-tier application database.

The first-tier application database comprises a plurality of tables, and each table in the first-tier application database comprises a plurality of records or rows, where each record comprises only a single end-use data column or data cell. Thus, if a record in a corresponding table in the production database comprises a key, a first data cell, a second data cell, and a third data cell, this record in the table of the production database is represented by three records in the corresponding table of the first-tier database: a first record comprising the key, the value contained in the first data cell of the production database record, a column identity (e.g., first data cell), a history value (e.g., a time and date stamp), and an optional user identity of the user who created or modified this first data cell; a second record comprising the key, the value contained in the second data cell of the production database record, a column identity (e.g., second data cell), a history value, and an optional identity of a user; and a third record comprising the key, the value contained in the third data cell of the production database record, a column identity (e.g., the third data cell), a history value, and an optional identity of a user.

When modifications are made to an existing record in the three-tier application database, one or more corresponding records are added to the first-tier application database. The previous state of the subject record remains stored in the first-tier application database, associated with the time and date it was introduced to the first-tier application database and optionally also associated with an identity of the user that introduced the record into the first-tier application database. This feature avoids locking problems where a first user is writing to the first-tier application database and that blocks a second user attempting to read from the first-tier application database (e.g., to conduct a historical search of the three-tier application database). The new state of the subject record is stored, associated with the time and date the modification occurred and optionally associated with the identity of the user who made the modification. The structure of the first-tier application database supports a "time travel" view of the three-tier application database.

The three-tier application database supports enforcement of access policies on a data cell-by-data cell basis. An administrator can define access permissions for a plurality of different user roles or user categories. For a given user role, the administrator can grant read permissions to a first column for the user role, grant read and write permissions to a second column for the user role, and deny both read and write permissions to a third column for the user role. In an embodiment, read and write permission is referred to simply as 'write permission' where the privilege to also read the data column is understood. In an embodiment, the denial of both read and write permissions is referred to as 'hidden permission.' The administrator can repeat this process of defining access permissions for each of a plurality of different columns of a table for each of a plurality of different user roles or user categories.

Additionally, the administrator can define access to an entire record for a user role or user category based on filters defined in terms of values or ranges of values of one or more column. The record access permissions, if defined for a user role or for a user, act as a possible constraint on access permissions otherwise granted to a user based on membership in a given user role. For example, a user assigned membership in an "Access Policy 2" user role may have a write access to data column 4 by virtue of membership in the "Access Policy 2" user role, but be denied access to write all of the contents of a record, including the data column 4, based on failing to meet a filter criteria on the given record. The filters can define an OR logical relationship or an AND logical relationship. For example, if the second column has the value of (1, 5, or 7) AND the fourth column has the value of (southwest or west coast). If the filter condition is met, a user in the subject user role can access the subject record within the constraints of the per column access policies that apply to this user role, otherwise the user access permissions to all the columns of the record may be further restricted by the access limitation specified in the filter definition, notwithstanding column access rules defined for that user role. When a user is configured for access to a table or spreadsheet, the administrator assigns that user to one of the user roles or user categories. User role access permissions and record access permissions are defined by the administrator independently for each different table or spreadsheet. A same user may have membership in different user roles or user categories for different tables; and different user role access permissions and different record access permissions may be defined by administrators for each different table or spreadsheet.

The second-tier application database may be said to mirror the first-tier application database tier in that it contains all the same columns as the first-tier application database. The second-tier application database, however, only comprises a single value for a given data cell corresponding to a record in the production database—the current value—and does not store previous values of the same given data cell. The second-tier application database contains the same number of tables as the first-tier application database. Each record of the second-tier application database comprises a key, a data cell, a column identity corresponding to that data cell, and a history value (e.g., a time and date stamp), and an optional user identity of the user who created or modified this data cell. Thus, each record of the second-tier application database comprises only a single data value cell. When an existing record of the three-tier application database is modified, the corresponding record or records of the second-tier database are updated accordingly. Alternatively, when an existing record of the three-tier application database is modified, the corresponding record or records of the second-tier database are deleted, and new edited versions of that record or records are introduced into the second-tier database. Hence the second-tier database contains only the current state of data values.

The third-tier application database may be said to at least partially mirror the second-tier application database. The third-tier application database contains the same number of tables as the first-tier application database and the same number of tables as the second-tier application database. Unlike the second-tier application database (as well as unlike the first-tier application database), every record of the third-tier database contains all the data columns associated with a given key. Said in other words, the corresponding record of the corresponding table in the production database comprises a specific number of end-use data cells per record; this record in the production database is represented by a single corresponding record in the third-tier database, represented by a plurality of records in the second-tier database, and by a plurality of records in the first-tier database. In an embodiment, the three-tier database is implemented in an Amazon web services PostgreSQL database.

The database management tool comprises a client application that provides a user interface that users may employ to create, read, update, and delete records from the application database and the production database. When the user logs in and identifies a specific table, the client application populates a session for the user with data associated with the specified table that is read from a cache. The client application does not populate information that the user is restricted from seeing based on either predefined user role access permissions or on predefined record access permissions. Likewise, the user is restricted by the client application from writing data that the user is restricted from writing based on either predefined user role access permissions or on predefined record access permissions. By 'predefined' is meant that an administrator has configured the user to membership in a particular user role, that the administrator has configured user role access permissions, and that the administrator has configured record filters that apply to the user role and/or to the user specifically before the user can log in.

In an embodiment, there is a separate cache for each separate table or spreadsheet. In another embodiment, there is a single cache that stores all records across all of the tables or spreadsheets of the third-tier database. In an embodiment, the cache is a flat text file that is rebuilt at least occasionally based on the state of the third-tier application database. In an embodiment, the cache is a flat JSON file that is stored in an Amazon web services S3 service. If there have been any updates (e.g., deltas) created since the cache was last rebuilt, the client application adapts what is presented to the user based on these updates. Additionally, users already logged into the client application or database management tool are updated as changes made by other users of the same table are committed, thereby keeping the table information presented to users continuously synchronized with the actual state of the three-tier application database.

The cache may be rebuilt periodically, for example once every ten minutes during a work day, every 15 minutes, once per hour, or some other periodic interval. The cache may be rebuilt when the number of pending changes exceed a predefined threshold. For example, if there are more than 5000 changes in the subject table since the associated cache was last rebuilt, the cache may be rebuilt at that time. The predefined threshold number of changes that automatically triggers rebuilding the cache may be 1000 changes, 2000 changes, 3000 changes, 4000 changes, 6000 changes, 7000 changes, 10000 changes, 15000 changes, 20000 changes, or some other number of changes. In an embodiment, the predefined threshold may be defined not in numbers of changes but in volume of changes in bytes. The cache may be rebuilt when pending changes exceed a threshold and also when a load on the client application drops below a predefined threshold level (e.g., if the client application has spare time, it may rebuild the cache even if the number of pending changes has not exceeded the predefined threshold). Use of the cache to initialize new user sessions provides more efficient access to the three-tier database, because a great many reads from the three-tier database may otherwise be needed to initialize a new user session, while instead reading these from the cache does not lock-up access to the three-tier application database in the same way.

As a user edits and commits changes to the three-tier database using the user interface, the client application generates deltas that are stored in work queues that may be referred to as buckets. Corresponding functions of the three-tier application database then process these deltas by updating the first-tier application database, the second-tier application database, the third-tier application database, and the production database. These changes are propagated to other users logged in to access the same table, so that concurrent user sessions are kept updated and synchronized with the three-tier application database.

When a predefined volume of changes have accumulated, a function of the three-tier application database updates the cache and empties the corresponding delta bucket. The cache is updated by reading from the third-tier application database which represents the database with records that have all the data columns of each of the tables. Thus, the third-tier application database has the primary function of making cache update quick and efficient without locking up access to the first-tier application database or the second-tier application database.

User searches of the three-tier application database are generally conducted against the second-tier application database. If the user search specifies time and date constraints, however, the search is conducted against the first-tier application database that contains historical information. The client application can support what amounts to time travel searches in the first-tier application database where the user can see a succession of different values for one or more specified records in the first-tier application database. In an embodiment, such historical searches can also provide information on what users made the edits.

Different users are associated with different roles by administrators of the three-tier application database. The client application uses the role of the given user and the pre-defined access permissions and the pre-defined record filters to provide an unusually fine granularity of access permission in an efficient way while still enhancing computer security. The access of users can be managed data column by data column differently for each different user role. Additionally, access to records can be restricted notwithstanding definitions of data column access based on predefined record filters.

The user interface can accept input from comma separated variable (CSV) files and automatically modifies existing records in the three-tier application database and production database or introduces entries of new records into the three-tier application database and production database. A modification of an existing record, results in a modification of an existing record in the third-tier database and results in a modification of one or more records in the second-tier database (recall that the second-tier database represents each data cell in a single record, and hence if a CSV modification modifies two or more data cells in a record of the third-tier database, this results in modification of more than one record in the second-tier database). A modification of an existing record results in the addition of a new record in the first-tier database. It is thought that conventional database systems do not accept CSV file inputs that involve modifying existing records of the database but only support adding new records. The client application can accept input from sourcing applications that may read out of corresponding tables in the production database to inject them into the three-tier application database. These two alternative input pathways are subjected to access permission authorization mediated by the client application.

The three-tier application database and the database management tool described herein were developed to manage complex infrastructure buildout projects for a wireless communication service provider, but it will be appreciated that the robust data management framework described can provide advantages and benefits when used with a wide variety of database systems. As an example, the three-tier application database and database management tool can be used to manage evolving inventory of equipment to build cell sites, vendor orders, shipments of equipment, status of build projects, and other logistical matters related to building a cell site (e.g., a cell phone tower). The three-tier application database and database management tool provides a particular technical solution to the technical problem of balancing needs of users with efficient use of computer resources. Specifically, users needing an initiation do not impede the access of users already connected, because their data is read from the cache, thereby avoiding blocking access of established users to the three-tier application database. Users who do not need history sensitive searches have their searches conducted more quickly in the smaller second-tier application database. Different user requests can be served concurrently without interfering with each other when they are different in nature, thereby supporting faster service to users. The use of the cache reduces interference with user sessions when new users log in. The use of the three-tier application database and client application can reduce the number of simultaneous connections to cloud compute resources and reduces blocking of connection attempts.

Figure 1B:
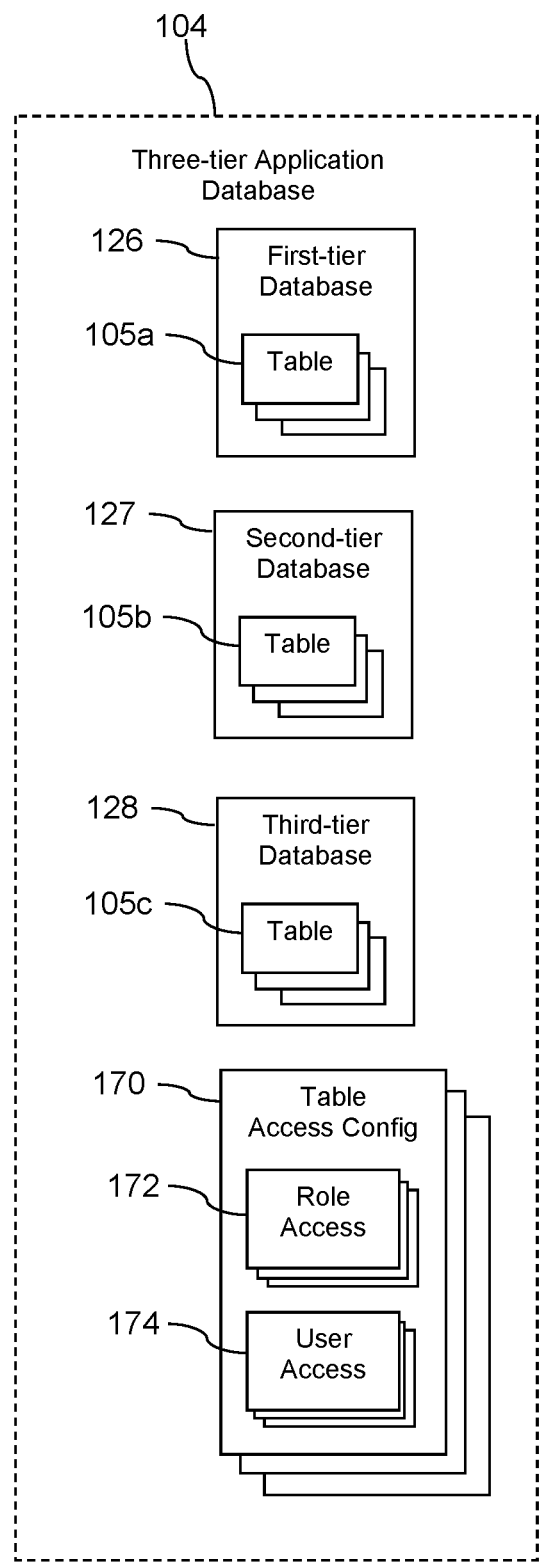
FIG. 1B is a block diagram of a three-tier application database according to an embodiment of the disclosure.

Turning now to FIG. 1A and FIG. 1B, a system 100 is described. In an embodiment, the system 100 comprises a database (DB) client application 102 that interacts with a three-tier application database 104, a cache 106, and a production database 116. The DB client application 102 extends a user interface 108 (e.g., in the form of web pages) via a network 122 to workstations 124 which allows users of the workstations 124 to interact with the three-tier application database 104 and with the production database 116. The three-tier application database 104 stores a plurality of tables 105 which may be referred to as spreadsheets in some contexts. The content of these tables 105 (e.g., the end-use data content) is also stored as tables in the production database 116, but the production database 116 may comprise tables and other data that are not stored in the three-tier database 104.

Each of the tables 105 in the three-tier application database 104 are stored in three different representational forms—each different representational form corresponding to one tier of the three-tier application database 104. For example, a first-tier application database 126 stores tables 105a in a first-tier table representational form described with reference to FIG. 4, a second-tier application database 127 stores tables 105b in a second-tier table representational form described with reference to FIG. 3, and a third-tier application database 128 stores tables 105c in a third-tier table representational form described with reference to FIG. 2. As discussed further below, each of the databases 126, 127, 128 may be thought of as storing the same substantive data or material data or end-user data as an abstract database. Create, update, and delete operations committed by a user are propagated to each of the databases 126, 127, 128 of the three-tier application database 104 and also to the production database 116. The cache 106 stores the current state of the end-user data at a point in time and is refreshed occasionally from the three-tier application database 104 on a triggering event. In an embodiment, the three-tier application database 104 is implemented as an SQL database, for example as a PostgreSQL database in Amazon web services (AWS). The DB client application 102, the three-tier application database 104, the cache 106, and the user interface 108 may be referred to as a data management tool 120.

When a user logs into the data management tool 120, the user enters user credentials via a workstation 124 to the user interface 108. In an embodiment, the user interface 108 presented to the user is a web page presented on a display of the workstation 124. The DB client application 102 authenticates the user credentials and looks up a user role or user category associated by the data management tool 120 to that user. The user role may be assigned to the user by an administrator using the DB client application 102, where the administrator is logged in with appropriate credentials to be permitted to execute special administrator operations and utilities provided by the DB client application 102. The administrator can further configure access permissions of read, write (e.g., read and write permission), or hidden for each different user role or user role or user category for each different data column. Additionally, the administrator can define record filters for each different user role or user category.

In an embodiment, an administrator may define a table access configuration 170 associated with each different table or spreadsheet in the three-tier application database 104. The table access configuration 170 defines user role access permissions 172 that may include both user role permissions and record permissions. The user role access permissions 172 further lists all users that are assigned to the subject user role. The table access configuration 170 further defines user access permissions 174 which may define record access permissions for a given user that vary from the record access permissions defined for the user role to which the subject user is assigned to. Each user role access permission 172 identifies the access allowed for each different data column of the given table for the subject user role. These permissions can be write permission (which includes inherently read permission), read permission (which excludes write permission), and hidden permission (which excludes both write and read permissions).

The role access permissions 172 may further define record access permissions for a user role that limit access of users who belong to the subject user group based on a filter associated with values of data columns. For example, a data column may define marketing regions as northeast, southeast, central, southwest, west coast, and northwest. A record filter defined for a west coast user role may stipulate that the marketing regions data column must have the value of 'west coast' otherwise the record access is reduced to 'hidden,' notwithstanding what role access permissions apply to the user role. The user access permissions 174 can define variances from the record filters assigned to a user role that apply to a specific user of the user role. The DB client application 102 evaluates access permissions for a user when that user logs in and applies both role access permissions 172 and user access permissions 174 as it streams data to the workstation 124 of that user.

The DB client application 102 provides a list of the different tables 105 in the user interface 108. The workstation 124 presents the list of different tables 105 to the user and receives a selection of one of the tables 105 from the user. The workstation 124 provides this selection to the user interface 108, and the user interface 108 and/or the DB client application 102 looks up data associated with the selected table in the cache 106. The user interface 108 presents at least some of the looked-up data associated with the Selected table 105 in a display of the workstation 124, for example a screen-full of the first 25 records, the first 30 records, or some other number of records. The workstation 124 may be a laptop computer, a notebook computer, a tablet computer, a desktop computer, or some other device. The user interface 108 provides the user and/or workstation 124 controls to advance or go back to view records in the selected table 105 of the three-tier application database 104. When the user is prohibited from reading and/or seeing some data in the selected table 105, this data is not displayed. In an embodiment, if the user hovers over a data cell that the user has write access to, the write access privilege is so indicated. In an embodiment, if the user hovers over a data cell that the user is not allowed to write, the write access denial is so indicated.

Because the data propagated to the workstation 124 during initiation of the user session is read from the cache 106, this may avoid overburdening the three-tier application database 104 by a plurality of users logging into the data management tool 120 at roughly the same time. Additionally, in an embodiment, the cache 106 is implemented as a text file that supports rapid reading and page loads. In an embodiment, the cache 106 is implemented using Amazon web services (AWS) S3 functionality. Changes to the content of the tables 105 may be collected in data storage referred to as buckets as these changes are made by users. The DB client application 102 may supplement that data propagated to the workstation 124 based on reading the cache 106 with changes stored in the buckets that have not yet been incorporated into the cache 106. In an embodiment, there is a separate cache 106 for each separate table or spreadsheet. In another embodiment, there is a single cache 106 that stores all records across all of the tables or spreadsheets of the third-tier application 128.

When a workstation 124 commits a write transaction against the three-tier application database 104, the write is completed by a write function 110 of the DB client application 102 to each of the databases 126, 127, 128 of the three-tier application database 104 and to the production database 116. When a workstation 124 executes a search, the search is completed by a search function 112 of the DB client application 102 against the second-tier application database 127 if it is not a historical based search (e.g., does not specify a time and date time constraint) or against the first-tier application database 126 if it is a historical search. If a search request from a workstation 124 includes a time and date time constraint, the search is completed by the search function 112 against the first-tier application database 126 which includes time and date information. A cache function 114 of the DB client application 102 monitors the volume of accumulated changes in a bucket within the DB client application 102. When accumulated changes exceeds a predefined threshold, the cache function 114 writes the changes to the cache 106, thereby updating the cache 106, and empties that particular bucket.

The user interface 108 supports a workstation 124 transmitting a bundle of data writes to the three-tier application database 104 by submitting a comma separated variable (CSV) file. The DB client application 102 and/or the write function 110 writes the subject changes to the three-tier application database 104 and to the production database 116. In an embodiment, a sourcing application 118 reads from the tables in the production database 116 and writes information to the DB client application 102 that in turn writes this information into the three-tier application database 104. This can provide a simple automated way to inject data from the production database 116 into the three-tier application database 104. If the key associated with the subject record of the table being injected by the sourcing application 118 does not exist, the whole record is added to the subject table 105 in the three-tier application database 104. If the key associated with the subject record of the table being injected by the sourcing application 118 exists, then the subject record referenced by the key in the table 105 is modified.

Figure 2:
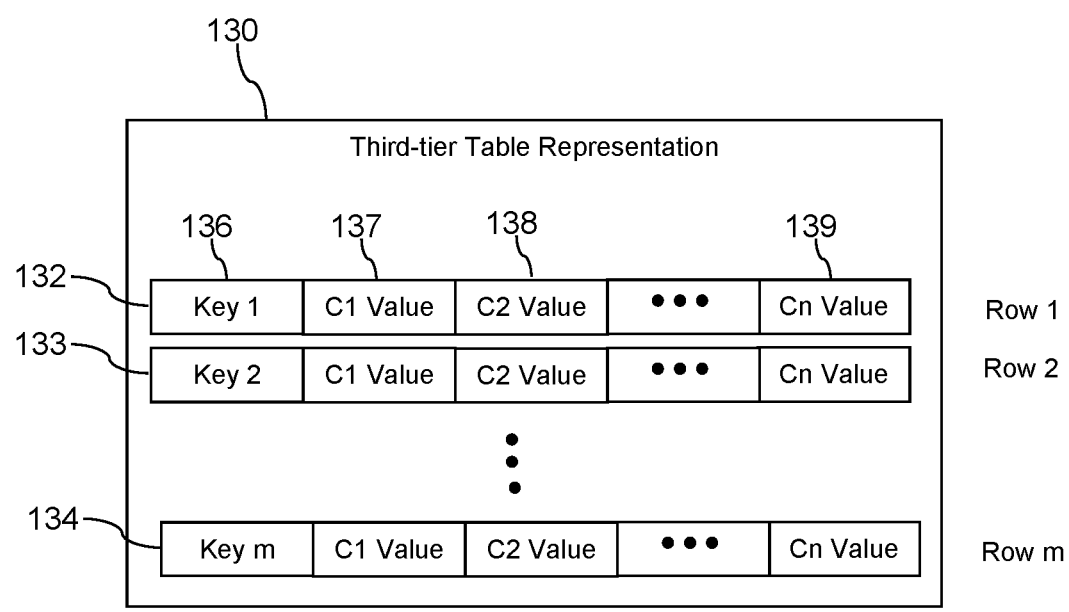
FIG. 2 is an illustration of a third-tier representation of a table in a three-tier database according to an embodiment of the disclosure.

Turning now to FIG. 2, a third-tier table representation 130 is described. The third-tier table representation 130 is used to store records in tables 104c in the third-tier application database 128. It will be appreciated that an abstract table can be said to be represented in each of the databases 126, 127, 128 of the three-tier application database 104 and in the production database 116 in different forms. This abstract table can be said to comprise multiple rows where each row comprises multiple columns or cells that contain data of interest. While the form of representation of this abstract table may differ in the production database 116 and in the three-tier application database 104, it may still be seen that the same data of interest (e.g., end-use data) is stored in the different representational forms. For example, an abstract table may contain wireless communication subscriber information where each abstract row comprises a key or index, an identity of a subscriber, a phone number of a subscriber, and an initial subscription enrollment date. The identity of the subscriber, the phone number of the subscriber, and the initial subscription enrollment date may be considered to be the substantive data or the material data or the end-use data stored in the abstract table. Each of the database 126, 127, 128 and the production database 116 may likewise store this same substantive data, but in different forms. Typically, the terms 'row' and 'record' are interchangeable when discussing database tables. Here the term row will be used to refer to a record in the abstract table while the term record will be used to refer to a record in the first-tier application database 126, in the second-tier application database 127, in the third-tier application database 128, or in the production database 116.

Each row of the abstract table corresponds to a single record in the third-tier table representation 130. A first row in the abstract table corresponds to a first record 132 in the third-tier table representation 130, a second row in the abstract table corresponds to a second record 133 in the third-tier table representation 130, and a third row in the abstract table corresponds to a third record 134 in the third-tier table representation 130. Each record in the third-tier table representation 130 comprises a record key (e.g., a row key or more simply a key) 136 and a plurality of columns or cells that contain data of interest, for example a first data column 137, a second data column 138, and a third data column 139. The number of data columns in the third-tier table representation 130 is the same as the number of data columns in the abstract table. It is understood that different tables 105c may have different numbers of data columns in the third-tier table representation 130. Each record of the same table comprises the same number of data columns in the third-tier table representation 130. In an embodiment, the third-tier application database 128 can support rapid rebuilding of the cache 106. Some tables 105c may have a hundred or more columns. In an embodiment, the plurality of data cells represented by data columns 137, 138, 139 in FIG. 2 are stored in the third-tier application database 128 not as separate independent columns but in a single column as a No SQL JSON value that comprises a series of column identities and associated values. This No SQL JSON column promotes flexibility in the third-tier application database 128 and the functions or methods that interact with third-tier databases 128 for different tables or spreadsheets.

Figure 3:
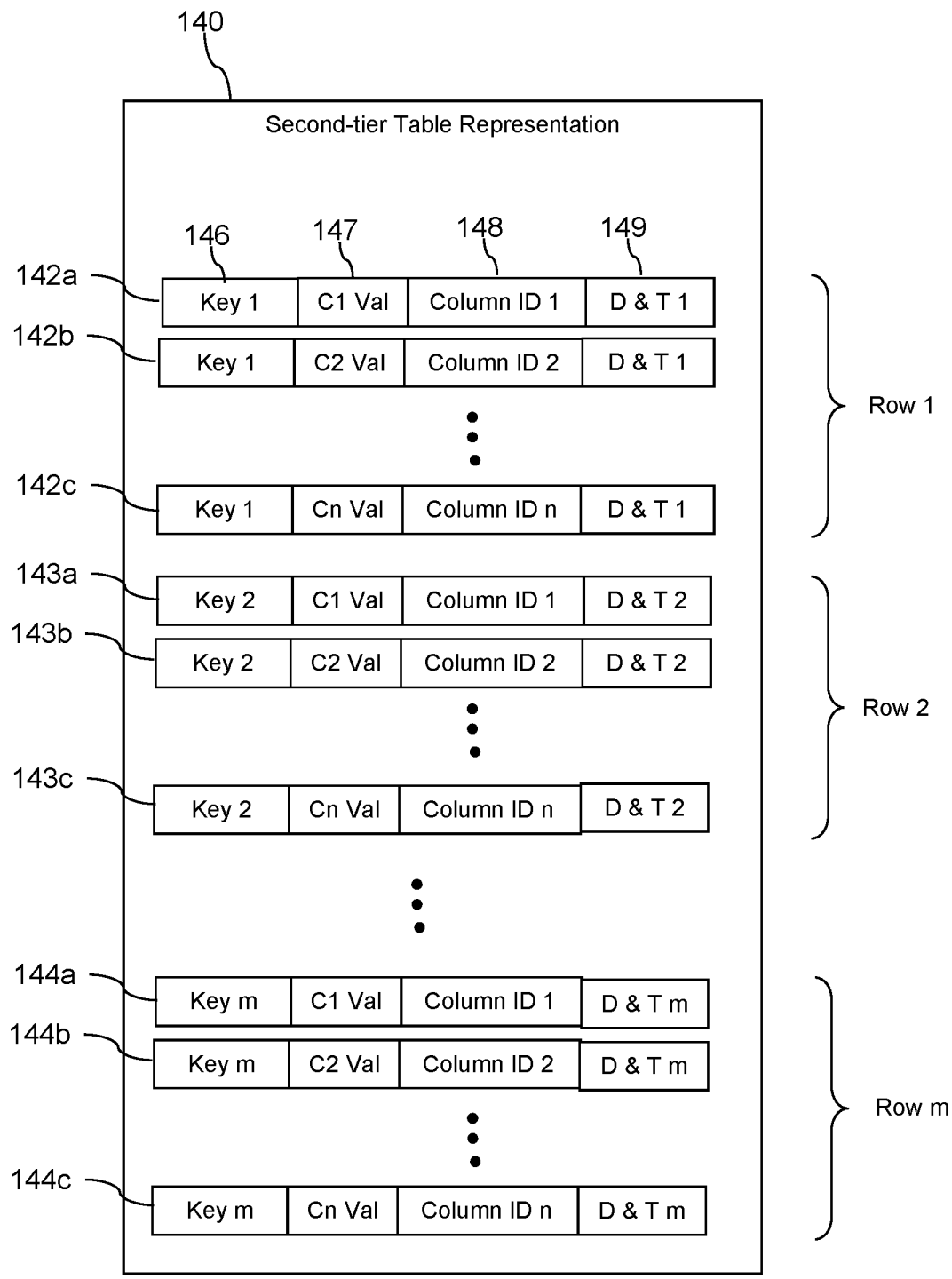
FIG. 3 is an illustration of a second-tier representation of a table in the three-tier database according to an embodiment of the disclosure.

Turning now to FIG. 3, a second-tier table representation 140 is described. Each row of the abstract table is represented by a number of records in the second-tier table representation 140 equal to the number of different data columns (e.g., columns containing end-use data) in the abstract table. Said in other words, each record in the second-tier table representation 140 comprises a single data cell (e.g., end-use data, a cell storing a substantive data value relevant to the purpose of the database). In an embodiment, each record of the second-tier table representation 140 comprises a record key 146, a data column 147, a column identity column 148, and a history column 149. While a single record of the third-tier table representation 130 stores the data content of an entire row of the abstract table, in the second-tier table representation 140 multiple records are used to represent the end-use data content of a row of the abstract table. For example, a first record 142a stores the key value associated with row 1 of the abstract table in the key column 146, stores the value associated with data column 1 of row 1 of the abstract table in the data column 147, stores an identity of the column in the abstract table whose value is populated into the data column 147 (here, the identity of data column 1 of the abstract table) in the column identity column 148, and stores the date and time that the value in the data column 147 of the first record 142a was established in the history column 149. It is understood that the second-tier application database 127 stores data values of only the current data. A second record 142b stores the key associated with row 1 of the abstract table in the key column 146, stores the value associated with data column 2 of row 1 of the abstract table in the data column 147, stores an identity of the column in the abstract table whose value is populated into the data column 147 (here, the identity of data column 2 of the abstract table), and stores the date and time that the value in the data column 147 of the second record 142b was established in the history column 149. A third record 142c stores the key associated with row 1 of the abstract table in the key column 146, stores the value associated with data column 2 of row 1 of the abstract table in the data column 147, stores an identity of the column in the abstract table whose value is populated into the data column 147 (here, the identity of data column 3 of the abstract table), and stores the date and time that the value in the data column 147 of the third record 142c was established in the history column 149.

It is noted that the second-tier table representation 140 uses three records to capture the data content of one record of the third-tier table representation 130. If the third-tier table representation 130 had fifty data columns, the second-tier table representation 140 would use fifty records to capture the end-use data content of one record of the third-tier table representation 130. The value of the data column 147 of the first record 142a in the second-tier table representation 140 is the same as the value of the first data column 137 of the first record 132 in the third-tier table representation 130, the value of the data column 147 of the second record 142b in the second-tier table representation 140 is the same as the value of the second data column 138 of the first record 132 in the third-tier table representation 130, and the data column 147 of the third record 142c in the second-tier table representation 140 is the same as the value of the third data column 139 in the third-tier table representation 130. In a similar way, the second row of the abstract table and the second record 133 of the third-tier table representation 130 are represented in the second-tier table representation 140 by a record 143a, a record 143b, and a record 143c; the third row in the abstract table and the third record 134 in the third-tier table representation 130 are represented in the second-tier table representation 140 by a record 144a, a record 144b, and a record 144c. The values contained in the data column 147 are all the latest or current value of the associated column of the abstract table. When a simple search (e.g., without a history constraint) is requested, the search function 112 executes the search on the second-tier application database 127.

Figure 4:
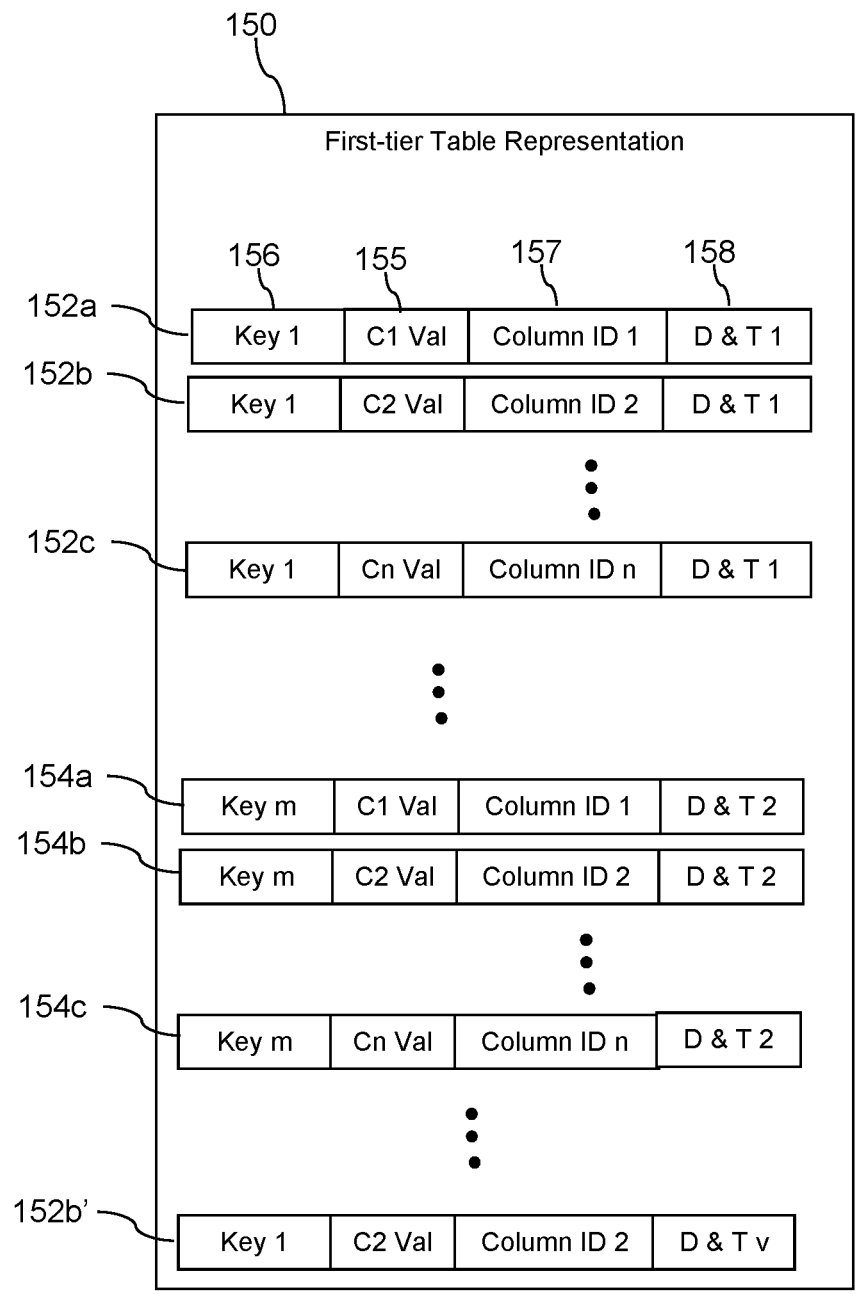
FIG. 4 is an illustration of a first-tier representation of a table in the three-tier database according to an embodiment of the disclosure.

Turning now to FIG. 4, a first-tier table representation 150 is described. For a given date of value establishment, each row of the abstract table is represented by a number of records in the first-tier table representation 150 equal to the number of different data columns in the abstract table. Said in other words, each record in the first-tier table representation 150 comprises a single data cell (e.g., end-use data: a cell storing a substantive data value relevant to the purpose of the database). Because the first-tier application database 126 comprises all historical values of the data columns, the first-tier application database 126 may comprise more records.

In an embodiment, each record of the first-tier table representation 150 comprises a key 156, a data column 155, a column identity column 157, and a date and time column 158. While a single record of the third-tier table representation 130 stores the data content of an entire row of the abstract table, in the first-tier table representation 150 multiple records are used to represent the data content of a row of the abstract table. For example, a first record 152a stores the key value associated with row 1 of the abstract table in the key column 156, stores the value associated with data column 1 of row 1 of the abstract table in the data column 155, stores an identity of the column in the abstract table whose value is populated into the data column 155 (here, the identity of data column 1 of the abstract table) in the column identity column 157, and stores a date and time when the subject data in the data column 155 was written into the first-tier application database 126. A second record 152b stores the key associated with row 1 of the abstract table in the key column 156, stores the value associated with data column 2 of row 1 of the abstract table in the data column 155, stores an identity of the column in the abstract table whose value is populated into the data column 155 (here, the identity of data column 2 of the abstract table), and stores a date and time when the subject data in the data column 155 was written into the first-tier application database 126. A third record 152c stores the key associated with row 1 of the abstract table in the key column 156, stores the value associated with data column 2 of row 1 of the abstract table in the data column 155, stores an identity of the column in the abstract table whose value is populated into the data column 155 (here, the identity of data column 3 of the abstract table), and stores a data and time when the subject data in the data column 155 was written into the first-tier application database 126.

The third row of the abstract table and the third record 133 of the third-tier table representation 130 are represented in the first-tier table representation 140 by a record 154a, a record 154b, and a record 154c. When an edit to an existing record in the abstract table occurs, the first-tier table representation 140 retains the original state and adds a new record containing the modified data, for example record 152b which suggests that the existing record 152b has had its data column 155 changed. The first-tier table representation supports searches that include a history constraint. For example, the first-tier table representation 150 can support a search that specifies data values written before a date and time or a search that specifies data values written between an initial date and time and an end date and time. The first-tier table representation also supports a search of the entire table across all data values and all history date and time values.

The access rules defined by an administrator for each of a plurality of user roles or user categories support the database client application 102 restricting user requests to read, search, write, and delete records in the three-tier application database 104 on a cell-by-cell basis as well as on a record-by-record basis. It will be appreciated that in a certain sense the first-tier table representation 150, the second-tier table representation 140, and the third-tier table representation 130 contain the same material data but can each support different functions of the data management tool 120 and/or of the three-tier application data store 104. The third-tier application database 128 and the tables 105c in the third-tier table representation 130 can support rapid rebuilding of the cache 106 because it stores all the current values of the abstract database. Each row in the abstract database corresponds to an associated record in the tables 105c in the third-tier application database 128. The second-tier application database 127 supports simple searches while applying a fine-grained access policy to such searches. The first-tier application database 126 supports historic searches while applying a fine-grained access policy to such searches.

Figure 5A:
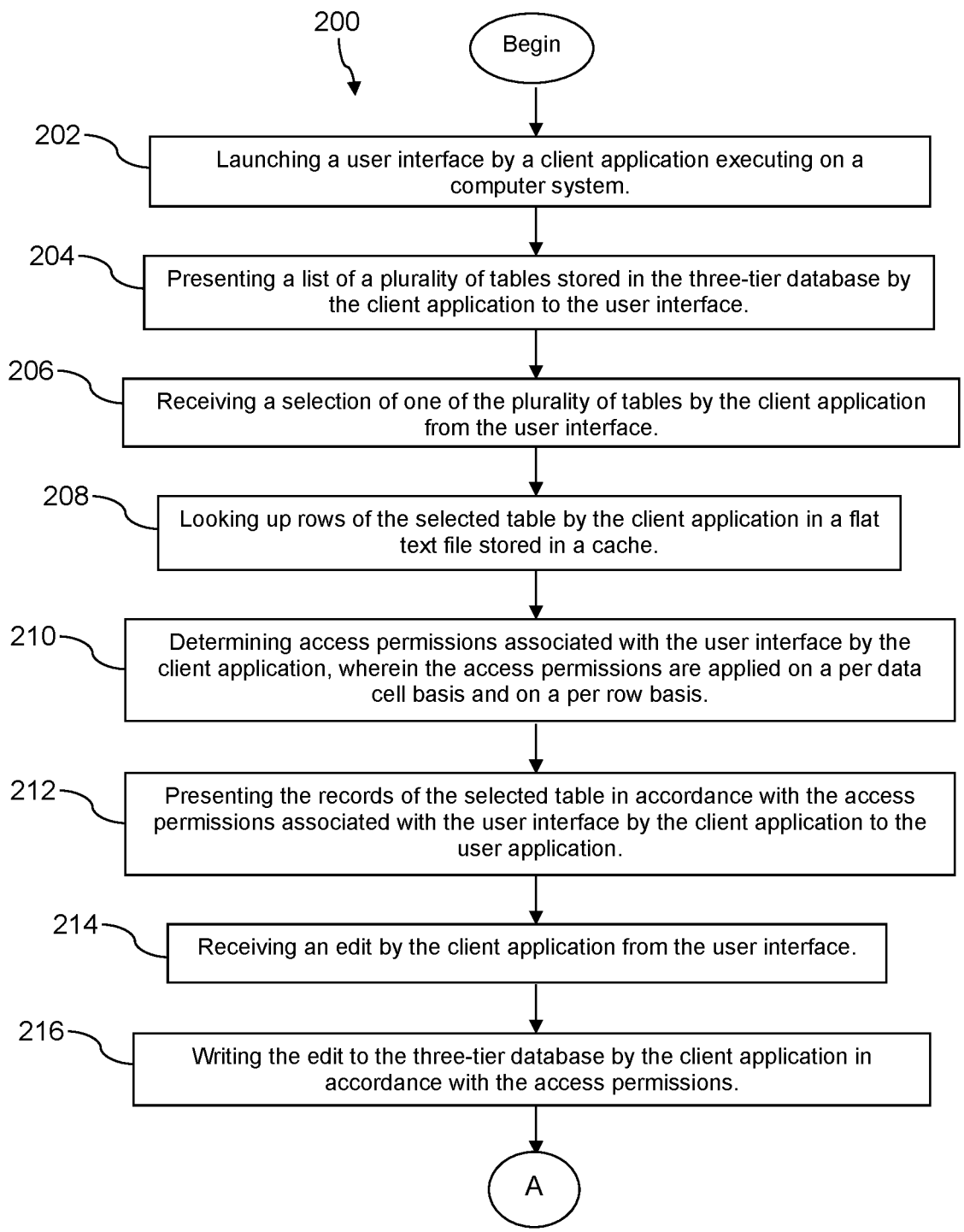
FIG. 5A and FIG. 5B is a flow chart of a method according to an embodiment of the disclosure.
Figure 5B:
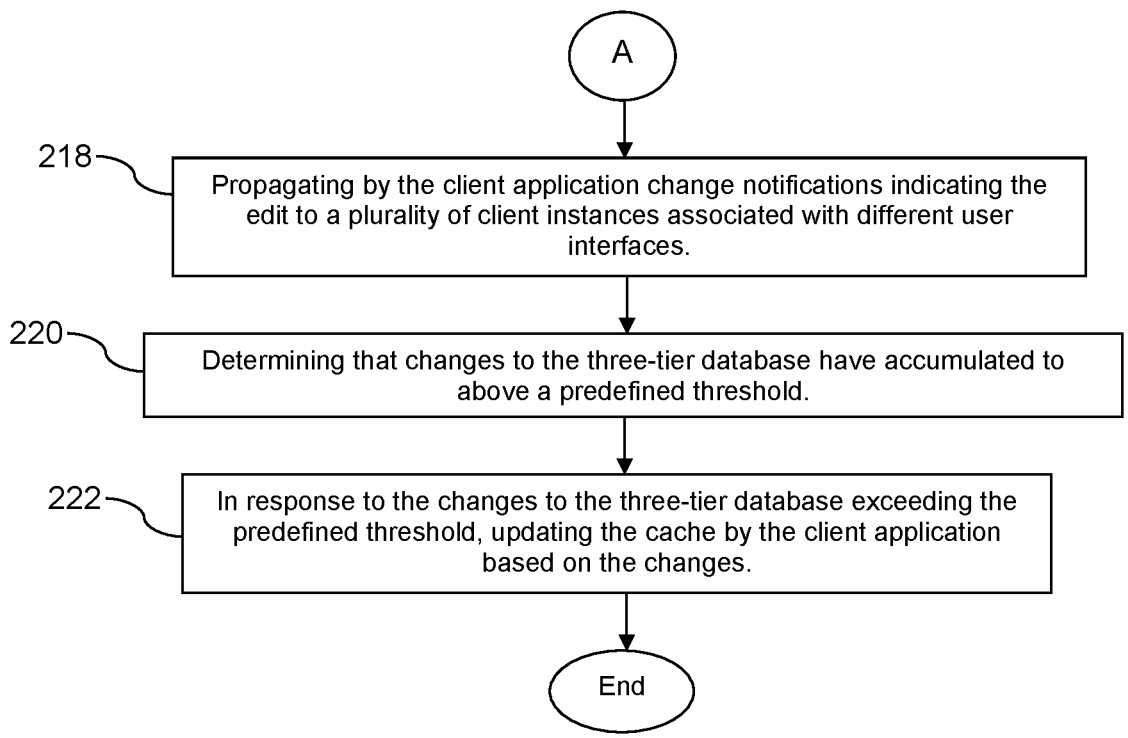

Turning now to FIG. 5A and FIG. 5B a method 200 is described. In an embodiment, the method 200 is a method of managing data using a three-tier database to support fast searching and cell-wise access policy management. In an embodiment, the three-tier database is stored in an Amazon web services PostgreSQL database. At block 202, the method 200 comprises launching a user interface by a client application executing on a computer system. At block 204, the method 200 comprises presenting a list of a plurality of tables stored in the three-tier database by the client application to the user interface.

At block 206, the method 200 comprises receiving a selection of one of the plurality of tables by the client application from the user interface. At block 208, the method 200 comprises looking up records of the selected table by the client application in a flat text file stored in a cache. In an embodiment, the cache is a flat text file. In an embodiment, the cache is a flat JSON file. In an embodiment, the cache is stored in Amazon web services (AWS) S3.

At block 210, the method 200 comprises determining access permissions associated with the user interface by the client application, wherein the access permissions are applied on a per data cell basis and on a per record basis. Access permissions are determined for a given user based on a role assigned to the user for the table or spreadsheet. A user may be assigned different roles in different tables or spreadsheets. An administrator may configure permissions for a given table or spreadsheet for access to data cells for each different column for each different role. Additionally, the administrator may configure permissions for access to a given record of the third-tier application database 128 (or the corresponding given row of the abstract database) based on a criterium defined based on values of one or more columns applicable to a user role. Said in other words, the administrator can define different record access criteria for different roles. At block 212, the method 200 comprises presenting the records of the selected table in accordance with the access permissions associated with the user interface by the client application to the user application.

At block 214, the method 200 comprises receiving an edit by the client application from the user interface. At block 216, the method 200 comprises writing the edit to the three-tier database by the client application in accordance with the access permissions.

At block 218, the method 200 comprises propagating by the client application change notifications indicating the edit to a plurality of client instances associated with different user interfaces. At block 220, the method 200 comprises determining that changes to the three-tier database have accumulated to above a predefined threshold. At block 222, the method 200 comprises, in response to the changes to the three-tier database exceeding the predefined threshold, updating the cache by the client application based on the changes.

In an embodiment, the method 200 further comprises receiving a search request by the client application from the user interface, searching a second-tier database of the three-tier database by the client application, and presenting search results by the client application via the user interface. In an embodiment, the method 200 further comprises receiving a search request by the client application from the user interface that specifies a historical search, searching a first-tier database of the three-tier database by the client application, wherein the first-tier database comprises history information its records, and presenting search results with edit history information by the client application via the user interface. In an embodiment, the method 200 further comprises receiving a search request by the client application from the user interface that requests file attached to a record in the three-tier database, retrieving a list of one or more links to files associated with the record by the client application from the three-tier database, and presenting the one or more links to files associated with the record by the client application via the user interface, whereby a user of the user interface is enabled to access the one or more files associated with the record using the one or more links to files.

In an embodiment, the method 200 further comprises receiving a comma separated variable (CSV) file upload request by the client application from the user interface, reading the CSV file by the client application, searching for keys present in the rows defined in the CSB file in the three-tier database, if a key of a row defined in the CSV file exists already in the three-tier database, modifying the corresponding existing record by the client application in the three-tier database and if a key of a row defined in the CSV file does not exists in the three-tier database, creating a record by the client application into the three-tier database. In an embodiment, the method 200 further comprises determining by the client application that the CSV file upload request conflicts with an access permission associated to the user that initiates the upload request, presenting a notification by the client application via the user interface that a column of data included in the CSV file will not be written into the three-tier database because the user does not have access permission to this column of data and presenting an option to the user to (a) continue the CSV file upload knowing the restricted column of data will not be written into the three-tier database and (b) cancel the CSV file upload. The access permission may be associated to the user based on a role assigned to the user. In an embodiment, the client application may determine access permissions of the user based on per data cell basis and/or based on a value contained in one or more data cells of a record of the third-tier application database 128.

Figure 6A:
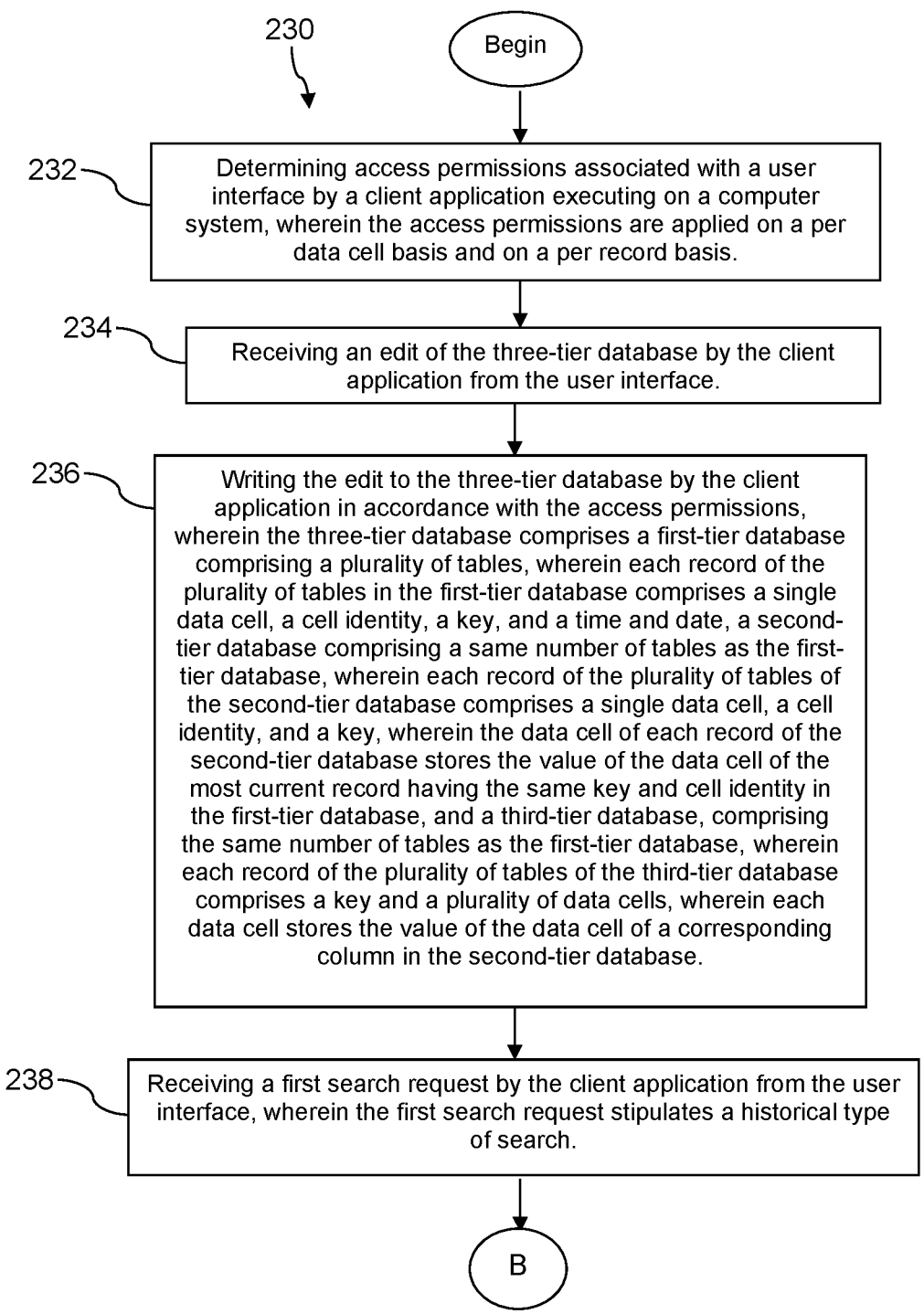
FIG. 6A and FIG. 6B is a flow chart of a method according to an embodiment of the disclosure.
Figure 6B:
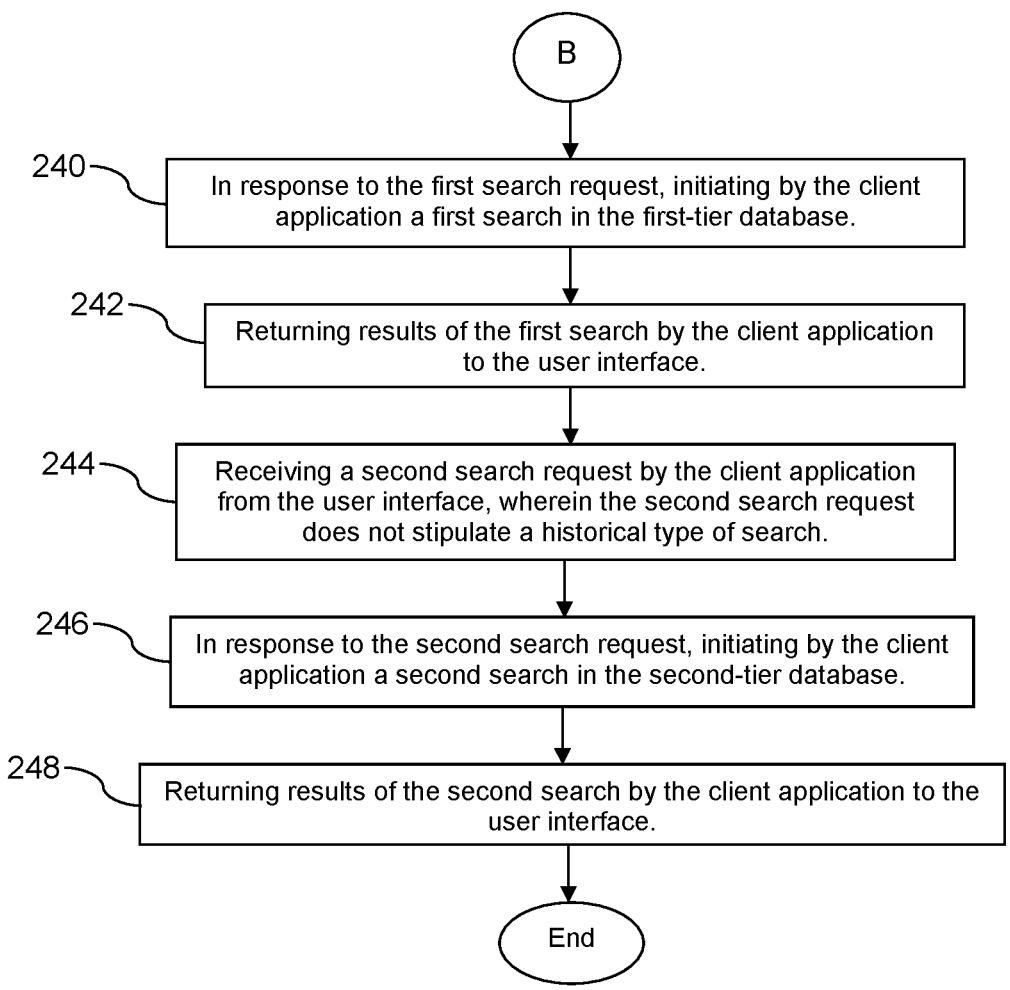

Turning now to FIG. 6A and FIG. 6B a method 230 is described. In an embodiment, the method 230 is a method of managing data using a three-tier database to support fast searching and cell-wise access policy management. In an embodiment, the three-tier database is implemented in an Amazon web services PostgreSQL database. At block 232, the method 230 comprises determining access permissions associated with a user interface by a client application executing on a computer system, wherein the access permissions are applied on a per data cell basis and on a per record basis. At block 234, the method 230 comprises receiving an edit of the three-tier database by the client application from the user interface.

At block 236, the method 230 comprises writing the edit to the three-tier database by the client application in accordance with the access permissions, wherein the three-tier database comprises a first-tier database comprising a plurality of tables, wherein each record of the plurality of tables in the first-tier database comprises a single data cell, a cell identity, a key, and a time and date, a second-tier database comprising a same number of tables as the first-tier database, wherein each record of the plurality of tables of the second-tier database comprises a single data cell, a cell identity, and a key, wherein the data cell of each record of the second-tier database stores the value of the data cell of the most current record having the same key and cell identity in the first-tier database, and a third-tier database, comprising the same number of tables as the first-tier database, wherein each record of the plurality of tables of the third-tier database comprises a key and a plurality of data cells, wherein each data cell stores the value of the data cell of a corresponding column in the second-tier database. In an embodiment, writing the edit to the three-tier database comprises writing the received edit into the three-tier database in time-based order with other edits received by the client application. In an embodiment, writing the edit in accordance with the access permissions comprises determining a role type of the user interface and determining if this role type has access permission to complete the received edit based on one or more data cells effected by the edit request.

In an embodiment, the method 230 further comprises writing the edit to a production database that is separate from the three-tier database, for example writing the edit to the production database 116. In an embodiment, the method 230 further comprises sending the edit by the client application to a plurality of other user interfaces currently logged in, for example to other user interfaces 108 supporting other sessions of workstations 124.

At block 238, the method 230 comprises receiving a first search request by the client application from the user interface, wherein the first search request stipulates a historical type of search. At block 240, the method 230 comprises, in response to the first search request, initiating by the client application a first search in the first-tier database.

At block 242, the method 230 comprises returning results of the first search by the client application to the user interface. At block 244, the method 230 comprises receiving a second search request by the client application from the user interface, wherein the second search request does not stipulate a historical type of search.

At block 246, the method 230 comprises, in response to the second search request, initiating by the client application a second search in the second-tier database. At block 248, the method 230 comprises returning results of the second search by the client application to the user interface.

Figure 7:
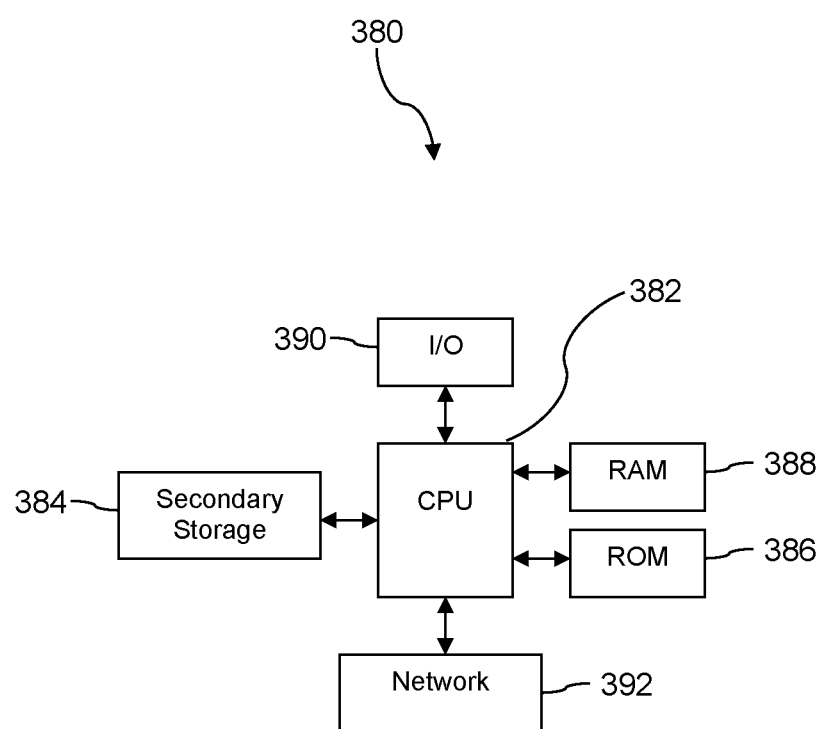
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WIFI (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A management tool for managing a three-tier database to support fast searching and cell-wise access policy management, comprising:
    a first-tier database comprising a plurality of tables, wherein each record of the plurality of tables of the first-tier database comprises a first single data cell, a first cell identity, a first key, and a first time and date;
    a second-tier database comprising a same number of tables as the first-tier database, wherein each record of the plurality of tables of the second-tier database comprises a second single data cell, a second cell identity, and a second key, wherein a data cell of each record of the second-tier database stores a value of a corresponding data cell of a most current record having the same key and cell identity in the first-tier database;
    a third-tier database comprising the same number of tables as the first-tier database, wherein each record of the plurality of tables of the third-tier database comprises a complete record comprising a third key and a plurality of data cells, wherein each data cell of the third-tier database stores a corresponding value of the data cell of a corresponding column in the second-tier database;
    a cache that is implemented as a flat text file, wherein the cache is rebuilt occasionally based on a state of the third-tier database existing at the time of initiation of the rebuilding and the cache stores data values stored in the data cells of the third-tier database at the time the cache is rebuilt;

a processor;

a non-transitory memory; and a client application stored in the non-transitory memory that, when executed by the processor:

launches a client instance associated with a user, reads a copy of one of the tables out of the cache, determines an access policy associated with the user associated with the client instance, where the access policy defines records and cells that the user is permitted to access and other records and other cells that the user is not permitted to access, in accordance with the access policy associated with the user, presents at least some of the records and at least some of the cells to the user, in accordance with the access policy associated with the user, receives an edit of at least one record and at least one cell from the user, propagates the edit to a table of the first-tier database that corresponds to the table copied out of the cache, propagates the edit to a table of the second-tier database that corresponds to the table copied out of the cache, and propagates the edit to a table of the third-tier database that corresponds to the table copied out of the cache.

2. The tool of claim 1, wherein the cache is implemented in a scalable cloud storage environment.

3. The tool of claim 1, wherein access policies are stored in a configuration artifact created by an administrator for the one of the tables of the three-tier database and the client application reads the access policies associated with the one of the tables from the configuration artifact.

4. The tool of claim 3, wherein the access policies identify access on a per data cell basis and on a per record of the third-tier database basis.

5. The tool of claim 3, wherein the access policies are defined for each of a plurality of different user roles.

6. The tool of claim 5, wherein determining an access policy associated with the user comprises determining a user role associated to the user.

7. The tool of claim 1, wherein the client application propagates the edit in the form of a delta to a delta storage list and presents the delta to the user.

8. A method of managing data using a three-tier database to support fast searching and cell-wise access policy management, comprising:

launching a user interface by a client application executing on a computer system;

presenting a list of a plurality of tables stored in the three-tier database by the client application to the user interface;

receiving a selection of one of the plurality of tables by the client application from the user interface;

looking up records of the selected table by the client application in a flat text file stored in a cache;

determining access permissions associated with the user interface by the client application, wherein the access permissions are applied on a per data cell basis and on a per record basis;

presenting the records of the selected table in accordance with the access permissions associated with the user interface by the client application to the user application;

receiving an edit by the client application from the user interface;

writing the edit to the three-tier database by the client application in accordance with the access permissions;

propagating by the client application change notifications indicating the edit to a plurality of client instances associated with different user interfaces;

determining that changes to the three-tier database have accumulated to above a predefined threshold; and in response to the changes to the three-tier database exceeding the predefined threshold, updating the cache by the client application based on the changes.

9. The method of claim 8, further comprising receiving a search request by the client application from the user interface, searching a second-tier database of the three-tier database by the client application, and presenting search results by the client application via the user interface.

10. The method of claim 8, further comprising receiving a search request by the client application from the user interface that specifies a historical search, searching a first-tier database of the three-tier database by the client application, wherein the first-tier database comprises history information in its records, and presenting search results with edit history information by the client application via the user interface.

11. The method of claim 8, further comprising receiving a search request by the client application from the user interface that requests file attached to a record in the three-tier database, retrieving a list of one or more links to files associated with the record by the client application from the three-tier database, and presenting the one or more links to files associated with the record by the client application via the user interface, whereby a user of the user interface is enabled to access the one or more files associated with the record using the one or more links to files.

12. The method of claim 8, further comprising receiving a comma separated variable (CSV) file upload request by the client application from the user interface, reading the CSV file by the client application, and modifying records by the client application in the three-tier database.

13. The method of claim 12, further comprising determining by the client application that the CSV file upload request conflicts with an access permission associated to the user that initiates the upload request, presenting a notification by the client application via the user interface that a column of data included in the CSV file will not be written into the three-tier database because the user does not have access permission to this column of data and presenting an option to the user to (a) continue the CSV file upload knowing the restricted column of data will not be written into the three-tier database and (b) cancel the CSV file upload.

14. The method of claim 8, wherein the cache is stored as a JSON file.

15. A method of managing data using a three-tier database to support fast searching and cell-wise access policy management, comprising:

determining access permissions associated with a user interface by a client application executing on a computer system, wherein the access permissions are applied on a per data cell basis and on a per record basis;

receiving an edit of the three-tier database by the client application from the user interface;

writing the edit to the three-tier database by the client application in accordance with the access permissions, wherein the three-tier database comprises a first-tier database comprising a plurality of tables, wherein each record of the plurality of tables in the first-tier database comprises a single data cell, a cell identity, a key, and a time and date, a second-tier database comprising a same number of tables as the first-tier database, wherein each record of the plurality of tables of the second-tier database comprises a second single data cell, a second cell identity, and a second key, wherein a data cell of each record of the second-tier database stores a value of a corresponding data cell of a most current record having the same key and cell identity in the first-tier database, and a third-tier database, comprising the same number of tables as the first-tier database, wherein each record of the plurality of tables of the third-tier database comprises a third key and a plurality of data cells, wherein each data cell of the third-tier database stores a corresponding value of a data cell of a corresponding column in the second-tier database;

receiving a first search request by the client application from the user interface, wherein the first search request stipulates a historical type of search;

in response to the first search request, initiating by the client application a first search in the first-tier database;

returning results of the first search by the client application to the user interface;

receiving a second search request by the client application from the user interface, wherein the second search request does not stipulate a historical type of search;

in response to the second search request, initiating by the client application a second search in the second-tier database; and returning results of the second search by the client application to the user interface.

16. The method of claim 15, wherein writing the edit to the three-tier database comprises writing the received edit into the three-tier database in time-based order with other edits received by the client application.

17. The method of claim 15, further comprising writing the edit to a production database that is separate from the three-tier database.

18. The method of claim 15, further comprising sending the edit by the client application to a plurality of other logged-in user interfaces.

19. The method of claim 15, wherein the three-tier database is implemented in a scalable cloud storage environment.

20. The method of claim 15, wherein writing the edit in accordance with the access permissions comprises determining a role type of the user interface and determining if this role type has access permission to complete the received edit based on one or more data cells effected by the edit request.

* * * * *